Dec. 5, 1933.   C. J. BIVER ET AL   1,938,209
THERMIONIC TUBE POWER CONVERTER
Filed Feb. 24, 1932

Inventor
George William Bain
Carl John Biver
By Charles W. Hills
Attorney

Patented Dec. 5, 1933

1,938,209

UNITED STATES PATENT OFFICE 1,938,209

THERMIONIC TUBE POWER CONVERTER

Carl John Biver and George William Bain, Owensboro, Ky., assignors to The Ken-Rad Corporation, Owensboro, Ky., a corporation of Kentucky Application February 24, 1932. Serial No. 594,937

3 Claims. (Cl. 171—97)

This invention relates to power conversion apparatus of the thermionic tube type employing alternating current circuits in connection therewith.

It is a primary object of our invention to provide means whereby power may be converted so that a high voltage direct current load may be supplied from a low voltage direct current source.

Figure 1:
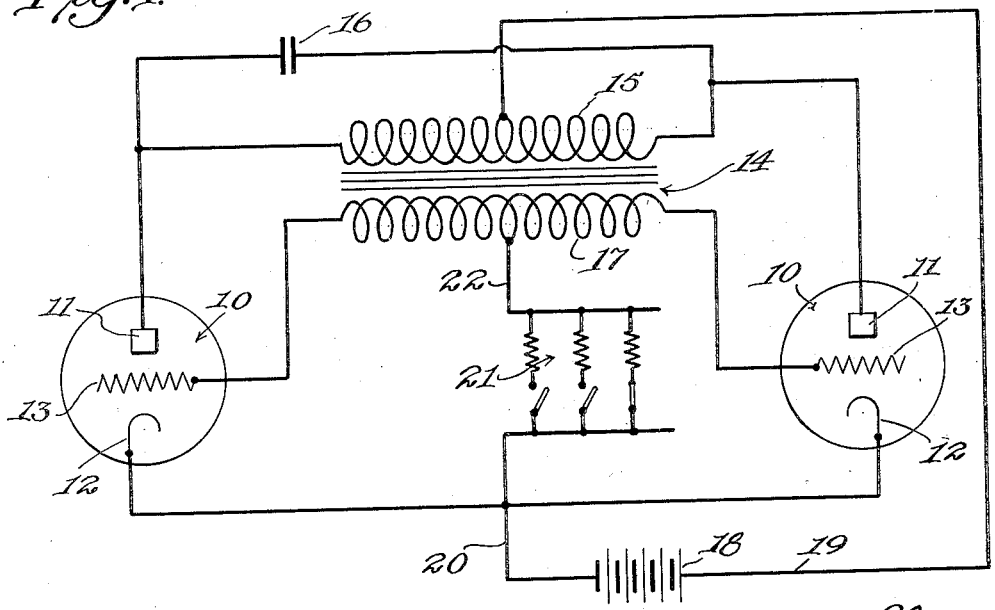
Figure 1 illustrates schematically an arrangement of instrumentalities employed in carrying out our invention.

Referring to Figure 1, the numerals 10 indicate generally a thermionic tube of the vapor electric discharge type containing a vapor of mercury or other suitable gas.

Each tube contains an anode 11, a cathode 12, and a control grid 13, and is provided with a heater (not shown) to heat the cathode.

A transformer 14 has the ends of its primary winding 15 connected to the anodes 11 of a pair of vapor tubes, and the winding is shunted by a condenser 16. The ends of the secondary winding 17, of the transformer 14, are connected to the grids of the tubes.

A source of direct current, such as a battery 18, is connected at its positive terminal by a conductor 19 to the mid-point of the primary winding 15, and the negative terminal of the battery is connected by a conductor 20 to the cathodes of the tubes.

A direct current load circuit 21 is connected to the cathodes by the conductor 20, and is also connected to the mid-point of the secondary winding 17 of the transformer by a conductor 22.

It will be obvious to those familiar with the art that when due attention is paid to the coupling between the anode and grid circuits the tubes function as generators of alternating currents having a frequency governed by the inductance and capacitance of the coupled circuits. When a transformer having a high ratio of secondary to primary turns is employed it is obvious that the voltage at the terminals of the secondary, and at the connected grids, is many times that of the battery 18.

Since the direct current load circuit is connected to the cathodes of the tubes and to the mid-point of the secondary winding, it follows that unidirectional impulses of current flow through the load circuit due to the well known rectifying action of the tubes.

It will be understood then, that the device shown converts power from a direct current source of low voltage to alternating currents of high voltage, and then rectifies the alternating current so produced to impress a unidirectional current of high voltage on the direct current load circuit.

A power converter having a similar mode of operation is described and claimed in a copending application, Serial No. 594,936, filed Feb. 24, 1932, by Carl John Biver.

Figure 2:
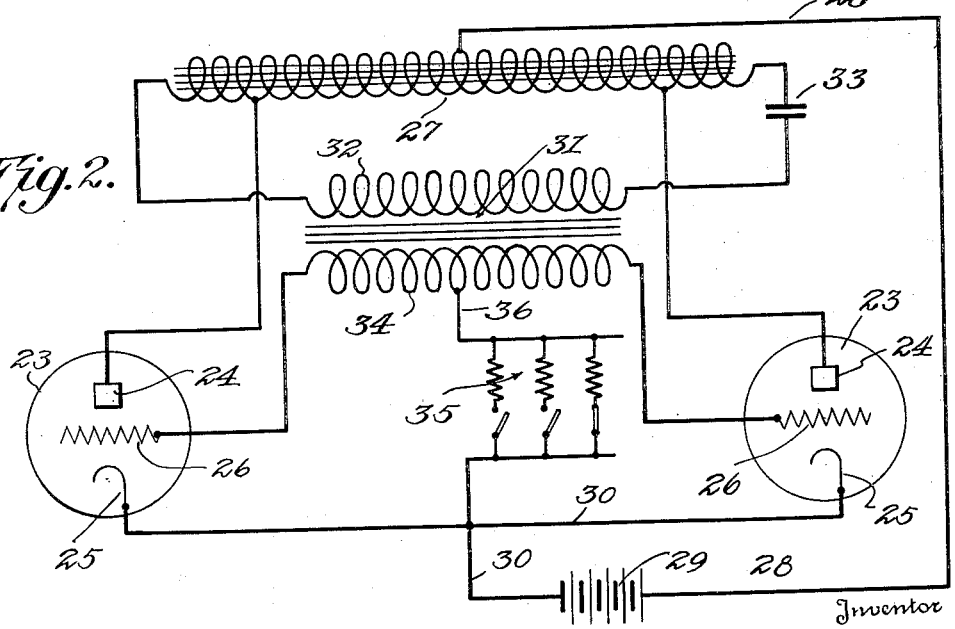
Figure 2 illustrates schematically a modified arrangement.

A modified form of converter having a mode of operation similar to that just described is shown in Figure 2. Referring now to Figure 2, the numerals 23 indicate generally a tube of the vapor type having an anode 24, a cathode 25, and a control grid 26. The tube is provided with a heater (not shown) to heat the cathode.

An inductance 27 is connected at its mid-point by a conductor 28 to the positive terminal of a source of direct current, such as a battery 29. The negative terminal of the battery is connected to the cathode 25 of the tube by a conductor 30. A step-up transformer 31 has is primary winding 32 connected at its ends to the ends of the inductance 27 through a blocking condenser 33. The secondary winding 34 of the transformer is connected at each end of the grids 26 of the pair of tubes shown.

The anodes 24 are connected to the inductance 27 at points between the mid-point and the ends of the inductance so that the direct current flowing to the anodes does not traverse all of the turns of the inductance, and the voltage between the ends of the inductance is higher than that between the connections to the anodes.

A direct current load circuit 35 is connected to the cathode 25 by the conductor 30 and to the mid-point of the secondary winding 34 by a conductor 36.

It is well understood by those familiar with the art that the frequency of the alternating current generated in a device of the kind described, is dependent upon the inductance and capacitance of the coupled circuits. It will be obvious that the transformer 14 of Figure 1, must have enough leakage reactance to store energy, and that the cores of the transformers 14 and 31, and of the inductance 27, should be chosen with due regard to the operating frequency and the direct current component of the current to obtain a low value of iron loss.

We are aware that many changes may be made and numerous details of construction may be varied through a wide range without departing from the principles of this invention, and we therefore do not purpose limiting the patent granted thereon otherwise than necessitated by the prior art.

We claim:—

1. In combination, a direct current load circuit, a direct current source, two thermionic tubes each having an anode, a cathode, and a control grid, an inductive coil connecting the anodes of said tubes, a conductor connecting said direct current source to said cathodes, a conductor connecting said current source to said anodes at a point midway of the ends of said inductance, another inductive coil magnetically coupled to said first coil connected to said control grids, and conductors connecting said direct current load circuit to said cathodes and to a point midway of the ends of said another coil.

2. In combination, a direct current load circuit, a direct current source, a pair of thermionic tubes each having an anode, a cathode, and a control grid, inductive coil means magnetically coupling said anodes and said grids, said direct current source being connected in the anode circuit of said tubes to send unidirectional current through a portion of said inductive coil means, said load circuit being connected in the grid circuit of said tubes.

3. In combination, a direct current load circuit, a direct current source, a pair of thermionic tubes each having an anode, a cathode, and a control grid, a transformer having one winding conductively connected to said anodes and having another winding conductively connected to said control grids, circuits associated with said anodes, said cathodes, and said control grids, said direct current source being connected in the anode circuits of said tubes, said load circuit being connected in the grid circuit of said tubes.

GEORGE WILLIAM BAIN.
CARL JOHN BIVER.